United States Patent [19]
Sadler

[11] 3,891,498

[45]* June 24, 1975

[54] METHOD OF INCREASING THE PRODUCTION RATE OF ASBESTOS FIBER CONTAINING ARTICLES AND PRODUCT THEREOF

[75] Inventor: Thomas Harry Sadler, Middlesex, N.J.

[73] Assignee: Johns-Manville Corporation, Denver, Colo.

[ * ] Notice: The portion of the term of this patent subsequent to Feb. 6, 1990, has been disclaimed.

[22] Filed: July 19, 1974

[21] Appl. No.: 490,638

Related U.S. Application Data

[63] Continuation of Ser. No. 206,211, Dec. 8, 1971, abandoned, which is a continuation of Ser. No. 699,285, Jan. 2, 1968, abandoned.

[52] U.S. Cl. .............. 162/154; 162/155; 162/164; 162/182; 162/183
[51] Int. Cl. ..................... D21h 5/18; D21f 11/00
[58] Field of Search ........... 162/154, 155, 164, 182, 162/183

[56] References Cited
UNITED STATES PATENTS

| | | | |
|---|---|---|---|
| 2,220,386 | 11/1940 | Badollet | 162/154 |
| 3,095,346 | 6/1963 | Sfiscko et al. | 162/154 |
| 3,715,230 | 2/1973 | Sadler | 162/154 X |
| 3,832,280 | 8/1974 | Stiefken | 162/154 |

FOREIGN PATENTS OR APPLICATIONS 1,238,831   4/1967   Germany

OTHER PUBLICATIONS

Zimmerman & Lavine, *Handbook of Material Trade Names*, 1953 Ed., p. 292, (GP 170).

*Primary Examiner*—S. Leon Bashore
*Assistant Examiner*—Arthur L. Corbin
*Attorney, Agent, or Firm*—Robert M. Krone; James W. McClain

[57] ABSTRACT

A mixture of particulate materials including asbestos fibers and hydraulic cement is combined with water to form a paste or slurry, to which paste or slurry is added a substantially non-foaming anionic sulfonated dispersant in order to increase the production rate at which asbestos-cement articles from said paste or slurry are formed.

13 Claims, No Drawings

METHOD OF INCREASING THE PRODUCTION RATE OF ASBESTOS FIBER CONTAINING ARTICLES AND PRODUCT THEREOF

This is a continuation of application Ser. No. 206,211, filed Dec. 8, 1971, now abandoned, which in turn is a continuation of application Ser. No. 699,285, filed Jan. 2, 1968, and now abandoned.

BACKGROUND OF THE INVENTION

1. Field of the Invention

This invention relates to the production of articles containing asbestos fibers, and more particularly, to those articles formed by the filtration of particulate material from a slurry in a conventional wet process operation or by the pressing out of excess water in a conventional dry process operation. The invention provides a system to increase substantially the production rate at which these articles are made. While the more specific embodiments of this invention are directed primarily to the manufacture of asbestos-cement articles by the filtration of particulate materials from a slurry wherein asbestos fibers, hydraulic cement, and silica are included in the particulate materials and, more particularly, to the manufacture of asbestos-cement pipe using chrysotile as the major fiber of such a slurry, it is to be understood that the broader aspects of the invention include the manufacture of any articles having asbestos fibers included therein.

2. Description of the Prior Art

For many years, the manufacturers of articles containing asbestos fibers, wherein the articles are formed by either a wet or dry process operation, have been continually working at ways and means to make the best articles at the highest production rates. In the manufacture of these articles and in particular relation to asbestos-cement articles, the quality of the formed asbestos-cement articles has been established and the major efforts are now directed to making these high quality articles at the best production rates. There are many patents directed to the systems and apparatus for the manufacture of asbestos-cement articles, and in particular two U.S. patents (Badollet, U.S. Pat. No. 2,220,386 and Sfiscko, U.S. Pat. No. 3,095,346 assigned to the Assignee of this invention) are directed to methods for increasing production rates by influencing the filtration characteristics of the slurry in a wet process. The system in the Badollet patent never achieved any degree of commercial success, but the system in the Sfiscko patent has enjoyed wide commercial use. In spite of the commercial success of the Sfiscko invention, the ever increasing pressures of competition force a continual effort to discover new and imporved ways and means to produce these articles in the most efficient manner.

SUMMARY OF THE INVENTION

It is an object of this invention to provide a system for influencing the filtration characteristics of a slurry containing asbestos fibers so that the production rate of the conventional apparatus used in producing these high quality articles by the filtration of the particulate materials from such a slurry is substantially increased.

It is another object of this invention to provide a system for the manufacture of high quality and high strength asbestos-cement articles, such as asbestos-cement pipe, at increased production rates on the equipment presently utilized for manufacturing such asbestos-cement pipe.

It is another object of this invention to provide a system for the manufacture of high quality and high strength asbestos-cement articles, such as asbestos-cement pipe, with lower cost materials but at the standard production rates and on the equipment presently utilized for the manufacture of such asbestos-cement articles.

It is another object of this invention to provide a system for the manufacture of high quality and high strength asbestos-cement articles so that the production rate of the conventional apparatus used in a dry process operation to produce these high quality articles is substantially increased.

DESCRIPTION OF THE PREFERRED EMBODIMENT

The foregoing objects are accomplished by the instant invention in association with the standard manufacturing facilities used in producing such articles and in particular in the system wherein portions of the particulate material in a slurry are deposited from the slurry onto a surface to form a continuous sheet of particulate material and wherein this sheet is then utilized to form such articles. The instant invention involves including in the slurry a non-foaming anionic dispersant which is normally used in recommended amounts to disperse the solids in the slurry and therefore lower production rates where filtration is associated with production rates. The advantageous results of the instant invention are obtained by using these non-foaming anionic dispersants in amounts substantially less than those recommended by the manufacturers for dispersion purposes. Significant advantages have been particularly gained in the manufacture of asbestos-cement pipe by including in the slurry an agent comprised of a sulfonic acid derivative and more specifically a sodium salt of condensed naphthalene sulfonic acid. It has also been found that a synergistic effect occurs when the dispersants of the instant invention are combined with the high molecular weight polyacrylamides of the type disclosed in the Sfiscko patent. The inventive concepts of this instant application have made it possible to produce high quality and high strength asbestos-cement pipe at increased production rates on the existing equipment presently used to produce such asbestos-cement pipe. Also, substantial increases in production rates have been obtained by including a non-foaming anionic dispersant as one of the materials in a conventional dry process operation.

The invention will be more fully understood and further objects and advantages thereof will become apparent when reference is made to the following detailed description of a preferred embodiment of the invention.

Over the years, the manufacturers of asbestos-cement articles have developed many tests which enable them to evaluate rapidly in the laboratory how various materials or processes might work when they are incorporated into an actual production operation. In view of the significance of the filtration rate of the asbestos-cement slurry to the manufacture of asbestos-cement products, special methods have been developed to evaluate the effect on the filtration characteristics of a slurry when various changes are made in the slurry. The Sfiscko patent from column 4, line 1 to column 5, line 44 sets out a method for making test samples to determine the filtration rate of an asbestos-cement slurry. Table II, in this portion of the Sfiscko patent, sets out a comparison of various materials and their effect on the filtration rate of an asbestos-cement slurry in which they are incorporated. This portion of the Sfiscko patent is incorporated as part of the instant specification.

During the prosecution of the Sfiscko application, it was accidentally discovered that the disclosure in the Badollet patent contained a mistake in the amount of freeness-increasing agent it recommended for use. This mistake is evident from the results in Table A, below, in which the times obtained on test cakes made following the procedures in the Sfiscko patent and using as suggested by Badollet a Turkey red oil as marketed by Apex Chemical Company, Inc. under the trade designation Turkey Red Oil No. 75 are recorded. In Table A, the percentages of Turkey red oil used are expressed as a percentage of the total solids so that a direct comparison can be made with the results in Table II of the Sfiscko patent. The percentages in relation to the total solids expressed as 0.02; 0.04; 0.06; 0.08 percent in Table A correspond to the percentages of 0.2 to 1.0 percent of the agent to the weight of the asbestos fibers as expressed on page 1, column 2, lines 48–49 of the Badollet patent.

in this area led to a conclusion that even though these materials were classified as dispersants that some advantages might be gained by trying them as agents to improve the filtration characteristics of an asbestos-cement slurry. Accordingly, following procedures set forth in the Sfiscko patent, test cakes were made using one of these dispersants. As illustrated in Table B, wherein the amount of dispersant used is expressed as a percentage of the total solids, the results were discouraging. Also, since some improvement had been gained by using Badollet's materials at ten times the usual amount, this dispersant was run at ten times the amount with disastrous results.

TABLE B

| % Tamol in Wet Mix (based on total solids) | — | 0.01 | 0.02 | 0.04 | 0.08 |
|---|---|---|---|---|---|
| Filter Time (sec) | 87 | 83 | 81 | 81 | 96 |
| % Tamol in Wet Mix (based on total solids) | — | 0.2 | 0.4 | 0.6 | |
| Filter Time (sec) | 88 | 90 | 153 | 212 | |

The dispersant used in Table B was a sodium salt of condensed naphthalene sulfonic acid marketed by Rohm and Haas under the trade designation Tamol.

In accordance with generally accepted company practice, the results recorded in Table B would dictate that no further efforts be made using dispersants to improve the filtration characteristics of an asbestos-cement slurry. However, it was decided to try a small wet machine run so that an observation of these dispersants could be made during the operation of a wet machine in actual production to see if any advantageous results might be produced in accordance with the original theory of making a denser product. The small wet machine is a conventional cardboard-making type of

TABLE A

| % Turkey Red Oil (total solids) | 0.00 | 0.02 | 0.04 | 0.06 | 0.08 | 0.0 | 0.2 | 0.4 | 0.6 | 0.8 |
|---|---|---|---|---|---|---|---|---|---|---|
| Filter Time (sec.) | 87 | 100 | 101 | 102 | 105 | 86 | 83 | 81 | 63 | 60 |

The results in Table A verify that any advantages gained by the materials suggested in the Badollet patent are not obtained until a quantity equal to about ten times the amount suggested by Badollet are used. Even then, the advantage to be gained is slight and only at the expense of the quality and strength of the products formed. It is quite possible that the results recorded in Table A set out the reasons why the materials suggested by Badollet never gained widespread commercial use.

During the never ending search for improvements in the overall production of asbestos-cement articles, a theory was developed that agents of the kind commercially classified as dispersants might be used in the manufacture of asbestos-cement articles but at quantities substantially less than those recommended to gain full dispersion so as to minimize filtration problems and yet gain some dispersing action of the cement and ultra fine particulate material to fill more adequately matrix voids and thus produce a denser product. Investigations machine having a mixing tank wherein a slurry, comprising asbestos fibers, hydraulic cement and silica as the particulate material, is prepared. The slurry is generally prepared to have a solids content of about 7 percent and is fed into a vat. The solids forming the slurry are filtered onto a cylinder mold in the vat and transferred as a continuous layer or filter mat onto a felt which carries the layer to an accumulator roll where the layer is rolled into a plurality of laminations. When the desired number of laminations have been formed on the accumulator roll, a longitudinal cut is made and the laminated layers are removed from the accumulator roll as a unitary sheet which is then subjected to conventional asbestos-cement curing operations.

Following the above process, a series of test runs on the small wet machine were made to produce asbestos-cement sheets and in each of the test runs the only variable was the amount of dispersant used. Each test run employed a 7 percent solids slurry wherein the solids comprised 20 percent chrysotile asbestos fibers (one time Entoletered) and 80 percent of a hydraulic cement and silex mixture in approximately a 6:4 ratio. The chrysotile asbestos fibers were of the type marketed by Johns-Manville Corporation under the trade designation 4T, the hydraulic cement comprised a portland cement marketed by National Pioneer Company under the trade designation portland cement Type A, the silex comprised of pulverized silica marketed by South River Sand Company under the trade designation Pulverized Silica, and the dispersant comprised Tamol, identified above. Each sheet produced by the wet machine measured 14 by 25 inches and was cut into 10 test cakes measuring 3 by 8 inches each. The results of these runs are expressed in the following Table C.

TABLE C

| Additive | Amount Used (ppm) | % Solids Slurry | Cake Properties (Avg. of 10 cakes) | | | % Change Dry Wt. Basis |
|---|---|---|---|---|---|---|
| | | | Thick (mm) | Dry Wt. gm/cake | Density gm/cm3 | |
| Control | none | 6.6 | 6.5 | 180 | 1.88 | Base |
| Tamol | 10 | 6.9 | 6.5 | 175 | 1.86 | −2.5 |
| Tamol | 50 | 7.0 | 8.3 | 232 | 1.88 | +29 |
| Tamol | 150 | 6.3 | 12.5 | 337 | 1.85 | +87 |

In view of these results, i.e., no density changes but production improvements, it was decided to make a series of test runs specifically aimed at examining production rates using the various agents that have been recommended for use in aiding the filtration characteristics of an asbestos-cement slurry. Accordingly, a series of runs were made on the small wet machine wherein the only variable was the kind and amount of agent used. The slurry was basically the same as that used in obtaining the results in Table C. The results of these test runs are expressed in the following Table D.

TABLE D

| Additive | Amount of Additive (based on total solids) | Production Rate (lb per hr per ft of felt width)* | % Change in Prod. Rate |
|---|---|---|---|
| Control | No Additive | 294.6 | Base Value |
| 1× Separan | 0.015% | 330.0 | +12.0 |
| 2× Separan | 0.030% | 381.8 | +29.6 |
| 1× Separan + 1× Tamol | 0.015% 0.05% | 506.9 | +72.1 |
| 1× Tamol | 0.05% | 464.1 | +57.5 |
| 2× Tamol | 0.10% | 513.6 | +74.3 |
| 10× Tamol | 0.5% | 320.8 | +8.9 |
| 1× Turkey Red Oil | 0.2% | 165.5 | −43.8 |
| 2× Turkey Red Oil | 0.4% | 141.4 | −52.0 |
| 10× Turkey Red Oil | 2.0% | 197.1 | −33.1 |
| 2× Marasperse N-22 | 0.1% | 362.1 | +22.9 | x is the optimum use level
*uniform felt speed of 47 ft per min.
Separan - identified in Sfiscko patent
Tamol - identified above
Marasperse - a sodium lignosulfonate marketed by Marathon, a Division of American Can Company under the trade designation Marasperse N-22.

The results in Table D showed that a synergistic effect is obtained when an agent such as Tamol is used in conjunction with a high molecular weight polyacrylamide of the type described in the Sfiscko patent. Therefore, a series of actual production runs were made in an asbestos plant wherein Tamol was added to the materials forming the slurry from which asbestos-cement pipe was being made. The apparatus used to produce the asbestos-cement pipe was of the type described in Rembert, U.S. Pat. No. 2,246,537. In all production runs, the difference between the solids content (100% solids) and the percentage of total fiber solids comprised hydraulic cement and silica in an approximate 6:4 ratio. The hydraulic cement comprised a portland cement Type A marketed by Atlas Cement Company with a cement sag designation of 0.026 (empirical control laboratory tests where low values are most desirable), and the silica comprised a locally marketed pulverized silica. The results of the various production runs are represented in the following Table E.

TABLE E

| Control Run No. | Tamol Run No. | % Dry Tamol | % Tamol Solution Used | W-1 % | A-25 % | S-4T % | Total Fiber Solids | Prod. Rate Cont. Run Tons/hr | Prod. Rate Tamol Run Tons/hr | % Improve. in Prod. Rate Tons/hr |
|---|---|---|---|---|---|---|---|---|---|---|
| | | | | (IN THE FIBER BLEND) | | | | | | |
| 15-1 | 15-2 | .05 | 10 | 15 | 45 | 40 | 17.8 | 6.7 | 7.9 | +18 |
| 15-4 | 15-3 | .10 | 10 | 10 | 90 | 0 | 18.6 | 5.2 | 7.9 | +50 |
| 16-1 | 16-2 | .05 | 10 | 10 | 90 | 0 | 18.6 | 5.85 | 9.1 | +55 |
| 16-4 | 16-3 | .10 | 10 | 10 | 0 | 90 | 18.6 | 6.60 | 10.0 | +51 |
| 17-1 | 17-2 | .05 | 10 | 10 | 90 | 0 | 18.6 | 5.55 | 7.6 | +37 |
| 17-4 | 17-3 | .10 | 10 | 10 | 90 | 0 | 18.6 | 5.55 | 7.6 | +37 |

The pipe made during runs 15-(1,2,3, and 4) was 6" Class 150 asbestos-cement pipe in 13 ft lengths.
The pipe made during runs 16-(1,2,3, and 4) and 17-(1,2,3, and 4) was 10" Class 150 asbestos-cement pipe in 13 ft lengths.

In the production runs in Table E, the asbestos fiber is identified as W-1 is a blue crocidolite marketed by Puttens Asbestos, Ltd. distributed by John Phillips & Son under the trade designation W-1. The S4T is a chrysotile asbestos fiber marketed by Johns-Manville Corporation under the trade designation S4T. The A-25 is a chrysotile asbestos fiber marketed by Johns-Manville Corporation under the trade designation A-25. Nalco, a high molecular weight polyacrylamide marketed by National Aluminate Inc. under the trade designation Nalco 633, was added to the slurry in all of these production runs. The results from these production runs clearly show the advantages gained by including a non-foaming anionic dispersant, such as Tamol, in the slurry used to manufacture asbestos-cement pipe.

Another advantageous result derived from using a non-foaming anionic dispersant in the slurry of an asbestos-cement pipe forming operation was discovered after making the production runs described in Table E. The hydraulic cement used in those production runs was a low sag (0.026) hydraulic cement. A separate series or production runs were made to see if the addition of a non-foaming anionic dispersant would permit use of a high sag (0.154) hydraulic cement in the manufacture of asbestos-cement pipe. Accordingly, a control run was made using a low sag (0.026) hydraulic cement of the kind used in the runs for Table E to establish that the apparatus was operating at the conventional production rate. Since it was known that the use of all high sag hydraulic cement was not possible, a trial run wherein the hydraulic cement comprised a 50-50 mixture of the above identified low sag (0.026) hydraulic cement and a high sag (0.154) hydraulic cement marketed by Penn-Dixie Cement Company was tried but the conventional production rate could not be maintained. Tamol was then added to the slurry using the 50-50 mixture of high and low sag hydraulic cements and asbestos-cement pipe were produced at the conventional production rate. The 50-50 mixture of high and low sag hydraulic cement was then replaced by all high sag (0.154) hydraulic cement with Tamol being added to the slurry at the rate of 0.05 percent of the total solids. High quality and high strength asbestos-cement pipe were produced using all high sag (0.154) hydraulic cement and Tamol during this run at a production rate equal to that obtained in the first part of the run when only the low sag (0.026) hydraulic cement was used. There is a major economic advantage in being able to use the high sag hydraulic cement to manufacture the conventional high quality and high strength asbestos-cement pipe. While the particular reasons for this accomplishment are not fully known, the results clearly show the advantages gained by including a non-foaming anionic dispersant, such as Tamol, in the slurry of the conventional machine for manufacturing an asbestos-cement product, such as asbestos-cement pipe.

In another kind of commercial operation, it is customary to produce asbestos-cement sheets having a thickness of about one-fourth inch and a dry density of 100 lbs per cubic foot on apparatus similar to the small wet machine described above. Before trimming, these sheets are 50 inches by 100 inches and are generally manufactured at the rate of about 43 sheets per hour. In a series of comparison runs on the same machine, the same day, and the same solids material in the slurry but where no other additives such as those described in the Sfiscko patent were used, the runs wherein a non-foaming anionic dispersant, i.e. Tamol "N", in an amount of 0.05 percent of the solids content was added produced such sheets at the rate of between about 70 and 75 sheets per hour.

In view of the advantages gained in adding a non-foaming anionic dispersant to the asbestos-cement slurry in the manufacture of asbestos-cement products, a series of runs were conducted to observe the results produced in adding a non-foaming anionic dispersant to the asbestos fiber slurry in a wet process machine for making asbestos paper. The results were so encouraging that it was decided to include the non-foaming anionic dispersant, i.e., Tamol, as a standard material to be added in the slurry for all production in a plant manufacturing asbestos fiber roofing felts and asbestos fiber pipe line felts of the type marketed by Johns-Manville Corporation under the designation: 9½ No. roofing felt; 10 No. roofing felt; 10 No. "TRANSHIELD"; ⅛ inch commercial; and 1/16 inch commercial. Using the monthly production rate average in tons per net hour for the month prior to the addition of Tamol as the basis, the monthly production rate average in tons per net hour for the two months following the addition of Tamol increased an average of 20 percent.

It has also been discovered that significant advantages may be gained by incorporating a non-foaming anionic dispersant, such as Tamol, in with the mixture of dry materials that are used in a conventional dry process used to form asbestos articles. In a conventional dry process, the dry materials, such as asbestos, silica, cement, and pigment are blended together and formed into batches by weight. Sufficient water is added to each batch to form a flowable paste which is fed into the bed of a press, subjected to hydraulic pressure to remove excess water and to form the desired article, and then subjected to standard asbestos-cement curing operations. In the manufacture of asbestos-cement articles using a conventional dry process wherein the dry materials comprised approximately 35 percent asbestos fibers, 23.5 percent silica, 39.5 percent cement, and 2 percent pigment, an increase in production rate of at least 15 percent was obtained by including dry micro pulverized Tamol as one of the dry materials in an amount of approximately 0.05 percent of the weight of the dry materials. Although the addition of Tamol as a dry material is preferred, it could be added as part of the water.

It is apparent from the foregoing discussion that non-foaming anionic dispersants have a rather unique effect on the production of articles containing asbestos fibers from a slurry containing particulate material including asbestos fibers by the deposition of portions of the particulate material onto a surface to form a sheet which is then used to form the article. It was also apparent that the advantageous results obtained from these dispersants were not readily apparent from their general classification in the art as dispersants and from the results obtained by using these materials in sample test programs to analyze their filtration characteristics. In the foregoing tests recorded in Tables C, D, and E, particular advantages are gained by including in an asbestos-cement slurry two particularly identified dispersants, Tamol and Marasperse. It was also discovered that similar advantages could be gained by utilizing related products from a group comprising sulfonic acid derivatives such as: a sulfonated benzimidazol derivative of a higher fatty acid marketed by Ciba Chemical and Dye Company, Inc. under the trade designation Ultravon WC; a sugar-free calcium lignosulfonate marketed by Lake States Yeast & Chemical Division, St. Regis paper Company under the trade designation Toranil B; a sodium alkyl naphthalene sulfonate marketed by National Aniline Division, Allied Chemical Corporation under the trade designation Naccosol A; a alkyl aryl sodium sulfonate marketed by National Aniline Division, Allied Chemical Corporation under the trade designation of Naccotan A; a sodium salt of a condensed mononaphthalene sulfonate marketed by Jacques Wolf and Company, Division of Nopco Chemical Company under the trade designation Lomar PW; a sodium salt of a condensed haphthalene sulfonate marketed by Jacques Wolf and Company, Division of Nopco Chemical Company under the trade designation Nopcosant; a sodium salt of polymerized alkyl naphthalene sulfonic acid marketed by Dewey and Almy Chemical Division, W. R. Grace and Company under the trade designation Darvan No. 1; sodium salts of polymerized substituted benzoid alkyl sulfonic acid marketed by Dewey and Almy Chemical Division, W. R. Grace and Company under the trade designation Darvan No. 2; sodium salts of polymerized alkyl naphthalene sulfonic acid marketed by Dewey and Almy Chemical Division, W. R. Grace and Company under the trade designation Darvan No. 15; a mono-calcium salt of polymerized alkyl aryl sulfonic acids marketed by Dewey and Almy Chemical Division, W. R. Grace and Company under the trade designation Daxad No. 21; sodium salts of polymerized substituted benzoid alkyl sulfonic acids marketed by Dewey and Almy Chemical Division, W. R. Grace and Company under the trade designation Daxad No. 23; sodium salts of substituted benzoid alkyl sulfonic acids and suspending agent marketed by Dewey and Almy Chemical Division, W. R. Grace and Company under the trade designation Daxad No. 27; sodium salts of substituted benzoid alkyl sulfonic acids and suspending agent marketed by Dewey and Almy Chemical Division, W. R. Grace and Company under the trade designation Darvan No. 3; and a group comprising sulfonated naphthalene formaldehyde polymers such as a sulfonated condensate of naphthalene formaldehyde marketed by New York Color and Chemical Company, Division of American Dyewood, Inc. under the trade designation Syntan NNC; a sodium salt of a sulfonated naphthalene-formaldehyde condensate marketed by Dyestuff and Chemical Division, General Aniline and Film Corporation under the trade designation Blancol; and a sodium salt of a sulfonated naphthalene-formaldehyde condensate marketed by Dyestuff and Chemicals Division, General Aniline and Film corporation under the trade designation Blancol N. The foregoing materials including Tamol and Marasperse are classified as dispersants in the publication: Detergents and Emulsifiers, 1964 Annual, Copyright 1964 by John W. McCutcheon, Inc.

The non-foaming anionic dispersants of this invention are effective to produce the advantageous results at very low concentrations from about 0.01 to 0.2 percent by weight based on the dry weight of the solids in the slurry. Greater amounts of the non-foaming anionic dispersants may be used, but the added usage is superfluous since it does not produce any added advantages. Furthermore, as the amount of the dispersant is increased, it begins to act in its normally intended manner as a dispersant with results detrimental to the production rate at which the articles are being produced. It is further noted that the amount of the dispersants required to produce the desired results varies with the percentage of the solids in the slurry and kind of material comprising the solids portion of the slurry.

It is to be understood that all the details in the foregoing description of the invention need not be strictly adhered to and that various changes and modifications may suggest themselves to one skilled in the art, all falling within the scope of the invention as defined by the subjoined claims.

What I claim is:

1. In the method of producing an asbestos-cement article from a slurry containing particulate material including asbestos fibers and hydraulic cement by depositing portions of said particulate material onto a surface to form a sheet of said particulate material which sheet is then used to form said article, the improvement comprising increasing the production rate at which said articles are produced by including in said slurry a substantially non-foaming anionic sulfonated dispersant in an approximate amount of 0.01 to 0.5 percent by weight based upon the total dry weight of the solids of the slurry.

2. A method as described in claim 1 wherein the sulfonated dispersant is a sulfonic acid derivative.

3. A method as described in claim 1 wherein the dispersant comprises a sodium salt of condensed naphthalene sulfonic acid.

4. A method as defined in claim 1 wherein the dispersant is a sulfonated naphthalene formaldehyde polymer.

5. A method as defined in claim 1 further comprising including in said slurry between about 0.005 and about 0.1 percent by weight, based upon the weight of the dispersed solids in the slurry, of a water-soluble, high-molecular weight polymer of an amide of the formula:

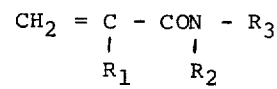

wherein $R_1$ is a radical selected from the group consisting of hydrogen and methyl, and $R_2$ and $R_3$ are hydrogen, one-to-four-carbon-atom alkyl, or one-to-four-carbon-atom hydroxy alkyl.

6. In the method of producing an asbestos-cement article from a slurry containing particulate material including asbestos fiber and hydraulic cement by depositing portions of said particulate material onto a surface to form a sheet of said particulate material which sheet is then used to form said article, the improvement comprising increasing the production rate at which said articles are produced by including in said slurry approximately 0.01 to approximately 0.2 percent by weight based upon the total dry weight of the slurry solids of a substantially non-foaming sodium salt of condensed naphthalene sulfonic acid anionic dispersant.

7. In the method of producing an asbestos-cement article from a slurry containing particulate material including asbestos fiber and hydraulic cement by depositing portions of said particulate material onto a surface to form a sheet of said particulate material which sheet is then used to form said article, the improvement comprising increasing the production rate at which said articles are produced by including in said slurry approximately 0.01 to approximately 0.2 percent by weight based upon the total dry weight of the slurry solids of at least one substantially non-foaming anionic dispersant selected from the group consisting of a sodium salt of condensed naphthalene sulfonic acid, a sodium lignosulfonate, a sulfonated benzimidazol derivative of a higher fatty acid, a sugar-free calcium lignosulfonate, a sodium alkyl naphthalene sulfonate, an alkyl aryl sodium sulfonate, a sodium salt of a condensed mononaphthalene sulfonate, a sodium salt of polymerized alkyl naphthalene sulfonic acid, a sodium salt of polymerized substituted benzoid alkyl sulfonic acid, a monocalcium salt of polymerized alkyl aryl sulfonic acid, a sulfonated condensate of naphthalene formaldehyde, and a sodium salt of sulfonated naphthalene formaldehyde condensate.

8. The method of claim 7 wherein there is additionally included in the said slurry about 0.005 to about 0.1 percent by weight based upon the weight of the dispersed solids in the slurry of a water-soluble, high-molecular-weight polymer of an amide of the formula:

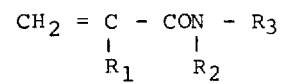

wherein $R_1$ is a radical selected from the group consisting of hydrogen and methyl, and $R_2$ and $R_3$ are hydrogen, one-to-four-carbon-atom alkyl, or one-to-four-carbon-atom hydroxy alkyl.

9. In the method of producing asbestos-cement articles from particulate materials including asbestos fibers and hydraulic cement wherein a mixture of said particulate materials is combined with water to form a paste from which excess water is removed by the application of pressure to form the articles, the improvement comprising increasing the production rate at which said articles are produced by including in said tially non-foaming anionic sulfonated dispersant in an approximate amount of 0.01 to 0.5 percent by weight based upon the total dry weight of the mixture.

10. An asbestos-cement article formed from a wet mixture comprising:
 a. asbestos fiber,
 b. hydraulic cement, and
 c. a substantially non-foaming anionic sulfonated dispersant in an approximate amount of 0.01 to 0.5 percent by weight based upon the total dry weight of the solid ingredients.

11. An article as defined in claim 10 wherein the dispersant is a sulfonic acid derivative.

12. An article as defined in claim 10 wherein the dispersant is a sulfonated naphthalene formaldehyde polymer.

13. An article as defined in claim 10 wherein the dispersant is a sodium salt of condensed naphthalene sulfonic acid.

* * * * *

UNITED STATES PATENT AND TRADEMARK OFFICE
CERTIFICATE OF CORRECTION

PATENT NO. : 3,891,498

DATED : June 24, 1975

INVENTOR(S) : Thomas Harry Sadler

It is certified that error appears in the above-identified patent and that said Letters Patent are hereby corrected as shown below:

Column 1, line 53, "improved" has been misspelled

Table E, "Total Fibers Solids" in heading of Column 6 should read "% Total Fibers Solids"

Column 6, line 40, "is" should not be there

Column 6, line 64, "or" should read "of"

Column 8, line 53, "haphthalene" should read "naphthalene"

Column 10, line 70, "including in said paste a substant-" has been partially obliterated in printing of the patent Signed and Sealed this fourteenth Day of October 1975

[SEAL]

Attest:

RUTH C. MASON
Attesting Officer

C. MARSHALL DANN
Commissioner of Patents and Trademarks